US006997138B1

(12) United States Patent  (10) Patent No.: US 6,997,138 B1
Simpson  (45) Date of Patent: Feb. 14, 2006

(54) PET ENCLOSURE

(76) Inventor: Jeffrey M. Simpson, 381 Oak Ridge Dr., Auburn, AL (US) 36830

( * ) Notice: Subject to any disclaimer, the term of this patent is extended or adjusted under 35 U.S.C. 154(b) by 0 days.

(21) Appl. No.: 10/612,589

(22) Filed: Jul. 2, 2003

Related U.S. Application Data

(63) Continuation-in-part of application No. 29/160,054, filed on May 2, 2002, now Pat. No. Des. 483,156.

(60) Provisional application No. 60/394,181, filed on Jul. 3, 2002, provisional application No. 60/465,119, filed on Apr. 24, 2003.

(51) Int. Cl.
*A01K 1/03* (2006.01)
(52) U.S. Cl. .................. 119/499; 119/474; 119/496; 217/122; 232/1 B
(58) Field of Classification Search ............... 119/499, 119/498, 482, 501, 496, 462, 165, 452, 459, 119/461, 474, 481; 135/143, 149, 151; 217/122, 217/124, 42, 51, 68; D30/108; 220/493, 220/494; 52/343, 791.1; 232/1 B
See application file for complete search history.

(56) References Cited

U.S. PATENT DOCUMENTS

| | | | |
|---|---|---|---|
| 318,812 A * | 5/1885 | Smith et al. .................. 217/47 |
| 539,394 A * | 5/1895 | Poulson et al. ............... 52/243 |
| 1,211,762 A | 1/1917 | Sawyer | |
| 2,247,598 A * | 7/1941 | Bohlen ........................... 5/102 |
| 2,560,661 A | 7/1951 | Poovey | |
| 2,789,531 A | 4/1957 | Diefendorf | |
| 2,892,562 A | 6/1959 | Smithson | |
| 3,738,322 A | 6/1973 | Smith | |
| 3,774,929 A | 11/1973 | Stanley | |
| 3,978,616 A | 9/1976 | Pennock | |
| 4,170,312 A * | 10/1979 | Lloyd et al. ............... 220/4.21 |
| 4,224,899 A | 9/1980 | Cruchelow et al. | |
| 4,256,056 A | 3/1981 | Sou | |
| D287,650 S | 1/1987 | Braeuner | |
| 4,696,259 A | 9/1987 | Fewox | |
| 4,762,085 A | 8/1988 | Ondrasik | |
| 4,989,546 A | 2/1991 | Cannaday | |
| 5,167,202 A | 12/1992 | Bradford et al. | |
| 5,203,281 A | 4/1993 | Harwich | |
| 5,282,542 A * | 2/1994 | Mo .............................. 220/7 |
| 5,464,113 A * | 11/1995 | Ho et al. ..................... 220/9.2 |
| 5,469,807 A | 11/1995 | Kosmaczeska | |
| 5,626,098 A | 5/1997 | Askins et al. | |
| 5,649,500 A | 7/1997 | Klavemann et al. | |
| D382,374 S | 8/1997 | Burks | |
| 5,845,970 A | 12/1998 | Schwartz | |
| 5,890,455 A | 4/1999 | Donchey | |
| 5,931,326 A * | 8/1999 | Weng ........................ 220/4.33 |
| 5,938,057 A * | 8/1999 | Cramer et al. .............. 217/123 |
| 5,960,744 A | 10/1999 | Rutman | |

(Continued)

OTHER PUBLICATIONS

In the Company of Dogs, Spring Preview 2001—Catalog, Portland, Tennessee.

*Primary Examiner*—Robert P. Swiatek
(74) *Attorney, Agent, or Firm*—Gardner Groff, P.C.

(57) ABSTRACT

A pet enclosure having a moisture and odor-resistant, plastic, rattan-like material woven onto a frame. The enclosure is foldably collapsible for compact storage and shipping, and is quickly and easily assembled with minimal or no tools. An elevated floor panel is securely but removably engaged to the framing of the enclosure. An access door pivots inwardly and outwardly, and can be latched in a closed position or an open position.

17 Claims, 12 Drawing Sheets

U.S. PATENT DOCUMENTS

| | | |
|---|---|---|
| 5,967,090 A | 10/1999 | Hui |
| D427,730 S | 7/2000 | Powers et al. |
| D442,748 S | 5/2001 | Farrugia |
| 6,354,245 B1 | 3/2002 | Roddy et al. |
| 6,601,723 B1 * | 8/2003 | Ziglar ..................... 220/4.34 |
| 6,694,918 B1 * | 2/2004 | Draft ........................ 119/453 |

* cited by examiner

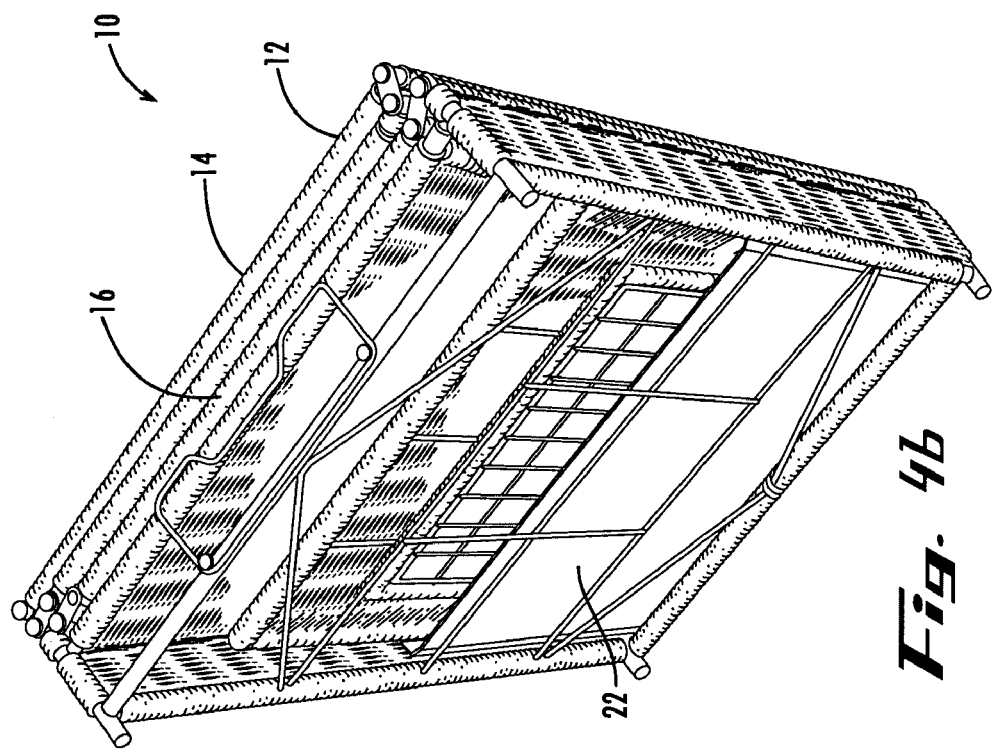
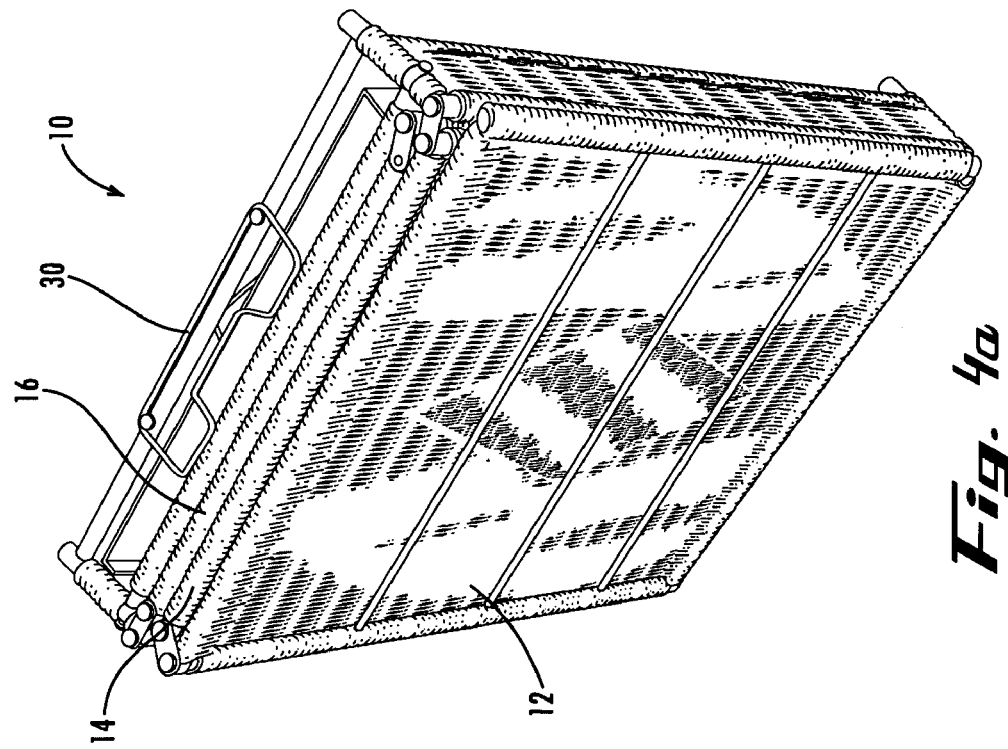

PET ENCLOSURE

CROSS-REFERENCE TO RELATED APPLICATIONS

This application is a continuation-in-part of application Ser. No. 29/160,054, filed May 2, 2002, now U.S. Design Pat. No. D483156; and claims priority to U.S. Provisional Patent Application Ser. No. 60/394,181, filed Jul. 3, 2002, and to U.S. Provisional Patent Application Ser. No. 60/465,119, filed Apr. 24, 2003. U.S. Design Pat. No. D483156, U.S. Provisional Patent Application Ser. No. 60/394,181, and U.S. Provisional Patent Application Ser. No. 60/465,119 are hereby incorporated herein by reference in their entireties for all purposes.

TECHNICAL FIELD

The present invention relates generally to the field of pet products, and more particularly to enclosures for domestic pets. The invention also relates to pet enclosures that can be shipped and/or stored in a folded or disassembled state and which can be easily set up or assembled for use, and subsequently re-folded or disassembled for storage and/or transport.

BACKGROUND OF THE INVENTION

Millions of households in the United States and throughout the world keep domesticated pets indoors. Allowing the animal to remain indoors reduces exposure to infectious diseases, territorial disputes with other neighborhood animals, and exposure to the harsher elements of weather, such as rain, snow, the cold of winter and the heat of summer. And, since an animal will not always be supervised as it undergoes various developmental stages such as teething and potty training, there often exists a need to enclose the animal when the owners are not present. Additionally, many veterinarians recommend having an enclosure for an animal that acts as a "safe place" that the animal may go even when the owners are home.

One common problem that has been found to exist with current pet enclosures is that they generally are not aesthetically pleasing or complimentary to the typical home decor. As a result, pet owners commonly hide the enclosure in areas not frequented by the family or guests. Often, however, it would be desirable to locate the enclosure in a more visible location, for example, for promoting the animal's usage of the enclosure while increasing human interaction with the pet.

Attempts have been made to provide pet enclosures that are more aesthetically appealing. Such past attempts have included the placement of veneering on the exterior of the enclosure to compliment the décor; however, this generally results in either poor ventilation for the animal, or the enclosure being too heavy and cumbersome to move conveniently. Another shortcoming of current pet enclosures is that they absorb and emit pet odors that can foul the smell of the entire house or apartment surroundings. For example, the inclusion of many materials such as wood and/or other natural materials, and/or natural or synthetic fabric into an enclosure can trap urine and other sources of unpleasant odors associated with animals. Attempts to reduce the absorption of odors have generally focused on fabricating the structure entirely of metal or other non-porous materials. This construction, however, typically results in an unattractive enclosure not complimenting to typical home décor, as discussed above.

Another shortcoming of many known enclosures is their lack of transportability. The construction of many enclosures often renders them too cumbersome to utilize on trips away from home. This may be caused by the amount of time and/or tools needed to set up and disassemble the enclosure, and/or the overall weight of the enclosure. Because of this inconvenience, many consumers are forced to purchase one enclosure for the house, and another less appealing, or less useful, but more easily portable enclosure for traveling.

Thus it can be seen that needs exist for improvements to pet enclosures to provide a more attractive appearance that matches a typical home decor, that does not absorb pet odors, and that is easily compacted for transport and/or storage outside the home.

SUMMARY OF THE INVENTION

The present invention is an enclosure for pets. In example embodiments, the enclosure of the present invention is attractive and complementary to a variety of home decors. In further embodiments, the enclosure of the present invention is fabricated from materials that do not absorb moisture or odors, that resist damage and deterioration from moisture, mold, mildew and the like, and which is easily cleaned. In further embodiments, the enclosure of the present invention is assembled from panels that are collapsible or foldable for compact storage and shipping, and is easily assembled by one person without tools or with only minimal tools.

In one aspect, the present invention a pet enclosure comprising a substantially rigid frame and a moisture-resistant plastic stranded material woven onto said frame to present the appearance of a rattan or wicker material. Weaving the material into the frame allows the enclosure to be disassembled and compacted to a flat shape.

In another aspect, the invention is a frame comprising a resilient material and at least one recess for receiving and engaging cooperating elements of at least two panels for attaching the panels together.

In still another aspect, the invention is a pet enclosure including a frame formed of a substantially rigid, non-porous material; and a flexible, non-porous material woven onto the frame.

In another aspect, the invention is a pet enclosure including a plurality of panels, each panel having a substantially rigid frame and a plastic material having the appearance of natural rattan or wicker woven onto the frame.

In yet another aspect, the invention is a pet enclosure including an opening in which a door is pivotally mounted to swing both inwardly and outwardly, and further including a latch for securing the door in a closed position and in an open position.

In another aspect, the invention is a pet enclosure including a floor panel and a plurality of legs for supporting the floor panel a distance above an underlying support surface.

In still another embodiment, the invention is a pet enclosure including a frame and a removable floor panel, the floor panel having at least one channel for receiving a cooperating portion of the frame.

In another aspect, the invention is a pet enclosure including a base portion; a first side panel hingedly connected to the base portion; a second side panel hingedly connected to the base portion; a first end panel hingedly connected to the base portion; a second end panel hingedly connected to the base portion; and a top panel hingedly connected to at least one of the first and second side panels and/or at least one of the first and second end panels.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

BRIEF DESCRIPTION OF THE DRAWINGS

FIGS. 4a and 4b show perspective views of an embodiment of a pet enclosure of the present invention, substantially similar to the embodiment of FIG. 1, in a folded or collapsed configuration.

FIGS. 7a–7c show schematic views of the two-way hinge arrangement of a door of a pet enclosure according an embodiment of the present invention.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
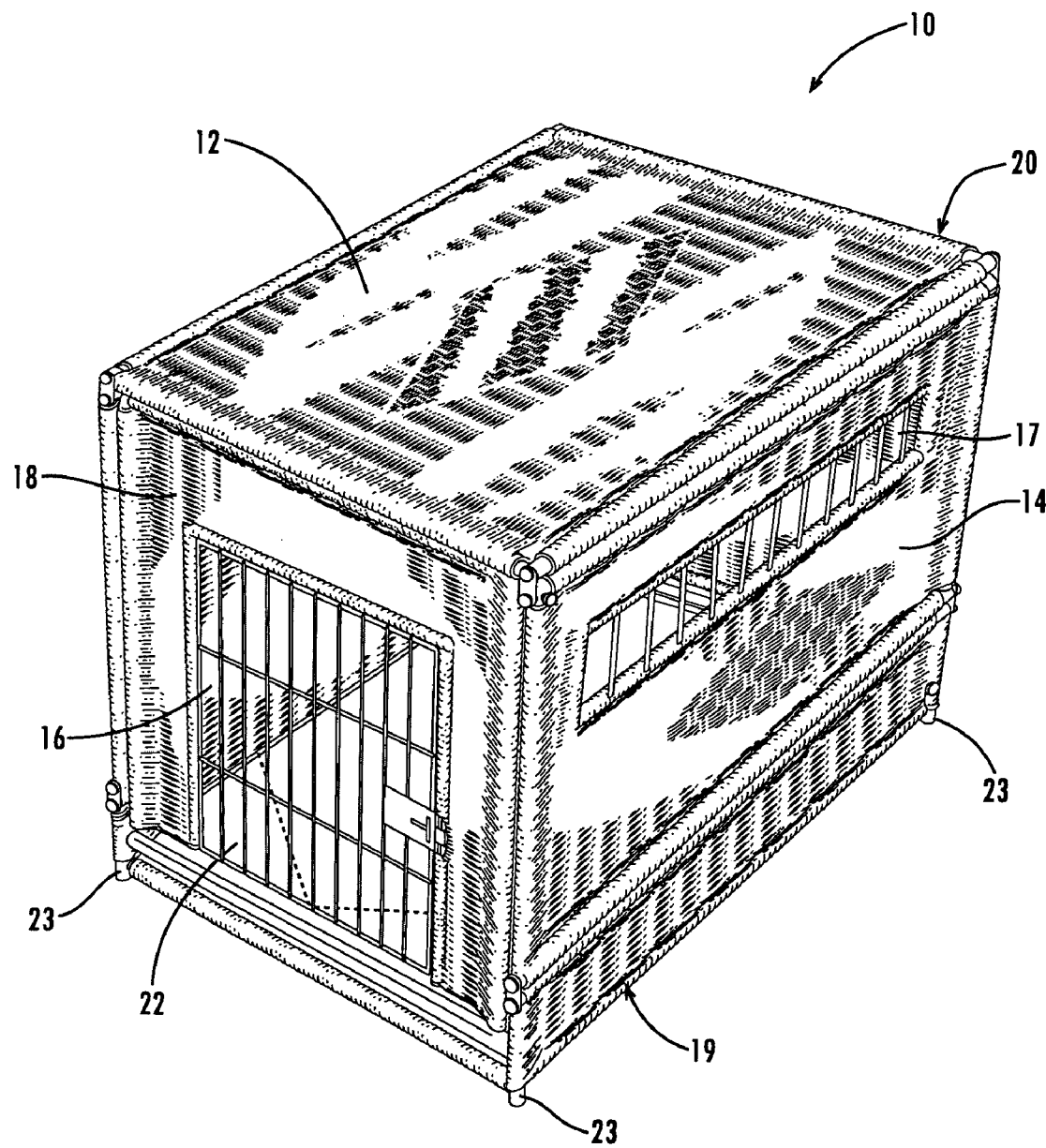
FIG. 1 shows a perspective view of an assembled pet enclosure according to one example embodiment of the present invention.
Figure 2:
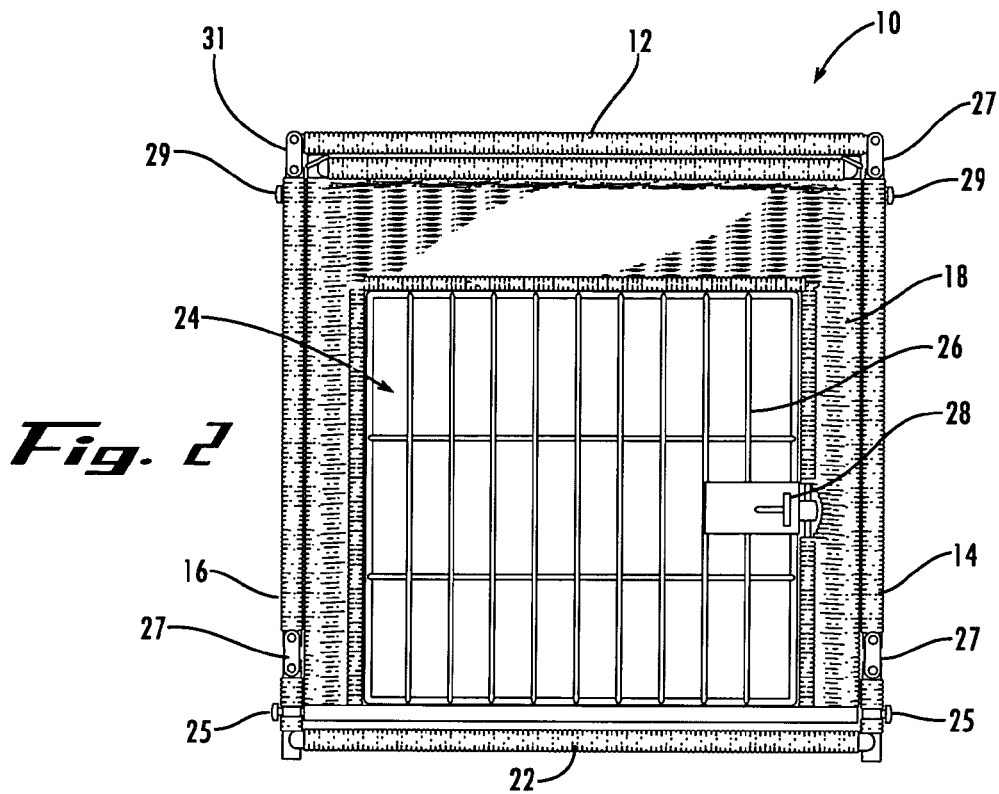
FIG. 2 shows a front view of the enclosure of FIG. 1.
Figure 3:
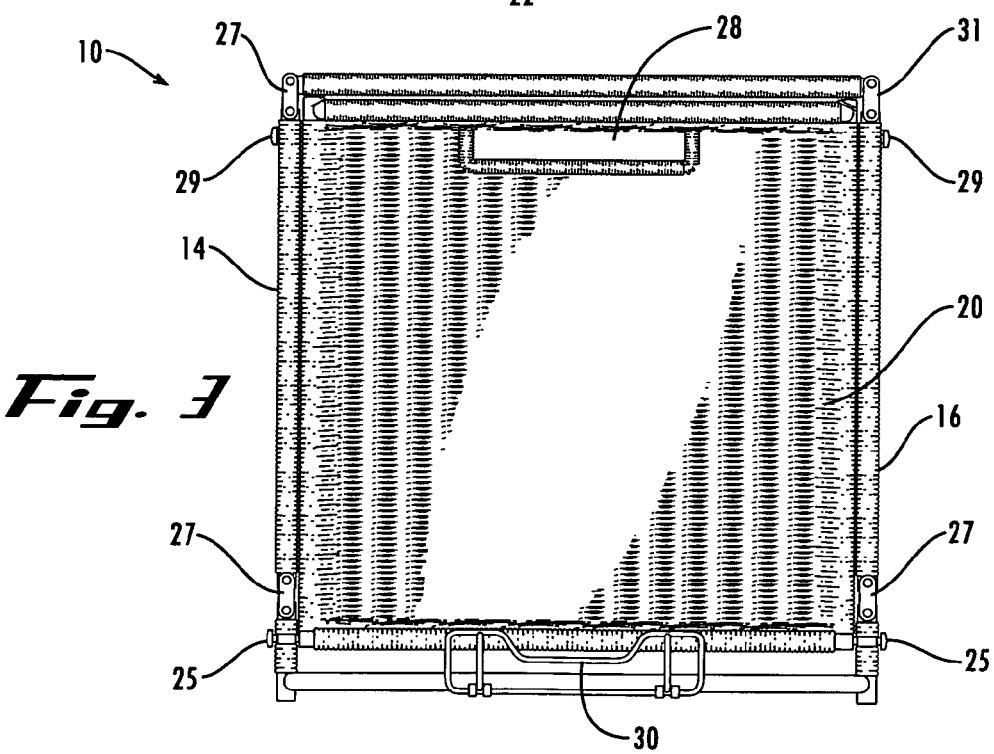
FIG. 3 shows a rear view of the enclosure of FIG. 1.

With reference now to the drawing figures, an enclosure 10 is shown by way of example embodiments of the present invention. The enclosure preferably comprises a plurality of generally rectangular panels, preferably including a top panel 12; first and second side panels 14, 16; a front panel 18; a back panel 20, and a bottom panel 22, as shown in FIGS. 1–3. When the enclosure is in this assembled or set-up configuration, the side panels 14, 16 and the end panels 18, 20 are upright and generally perpendicular to the generally horizontal bottom panel 22; the side panels 14, 16 are generally parallel to one another and generally perpendicular to the end panels 18, 20; and the top panel 12 is generally perpendicular to the side panels 14, 16 and the end panels 18, 20; thereby forming a generally rectangular box-like structure.

The back panel 20 preferably defines an aperture 28 for use when assembling and disassembling the enclosure, and for moving the enclosure. A handle 30 is preferably provided for use when transporting the enclosure once disassembled. The side panels 14, 16 preferably define a longitudinal opening 17 for ventilation of the enclosure. The front panel 18 preferably defines an opening 24 therein for access by a housecat, domestic dog or other pets of typical size. Different sizes of enclosures may be provided for pets of different sizes. The front panel 18 also preferably comprises a door 26 preferably hinged on a vertical axis to allow the door 26 to swing both inwardly into the enclosure and outwardly from the enclosure, and to latch in a closed position and in an inwardly open position. The door preferably comprises a latch 32 that is operable with one hand. Latching the door in the closed position prevents entry and/or exit; whereas latching the door in the inwardly open position allows free entry and exit without unintentional closing, and without the open door extending into human living space where it might create a tripping hazard or obstruct a walkway.

The panels of the enclosure 10 preferably comprise frames formed of substantially rigid, non-porous material(s) onto which strands or sheets of flexible, non-porous material are woven or otherwise affixed. Each frame preferably comprises a rectangular peripheral structure of four cornerposts with one or more intermediate framing members extending therebetween for structural support and/or for interweaving or attachment of the strands or sheets of flexible, non-porous material thereon. In example embodiments, one or more strands of flexible material(s) such as thermoplastic extruded resin having the appearance of natural rattan or wicker, are woven onto frames constructed of rods or wires of steel or other metal(s), rigid plastic, or like material(s). In a particular embodiment, the strands are extrusions of high-density polyethylene having a yellow, tan or brown color; and optionally having one or more lines or patterns, preferably of a visibly darker or lighter shade of yellow tan or brown, coextruded therewith or otherwise applied thereon along the axis of the strand. The strands are preferably about 3/32" in diameter or width, and optionally have one or more serrations or surface irregularities extruded generally along the axis thereof to reduce glare and provide a more natural appearance. So constructed, the enclosure complements many home decor schemes. The wire framing is optionally painted or coated with plastic for improved appearance and resistance to corrosion and discoloration, and/or for ease of cleaning. One or more of the panels may be woven with a decorative pattern or design for even further improved aesthetics.

The enclosure 10 is preferably foldable or collapsible for easy and compact storage and transport, and easily and quickly assembled for use. Assembly of the enclosure 10 is preferably enabled without the necessity of tools, or with only minimal, commonly available household tools. The depicted embodiments of the enclosure 10 comprise panels that are hingedly connected to a base structure 19 and/or to one another for ease of set-up and take-down. For example, the bottom panel 22 preferably forms part of a base portion of the enclosure, which is supported a small distance above the underlying surface by four feet 23, which are preferably formed of or coated with a rubber, plastic or other soft material to prevent marring of the floor or other underlying support surface. The front panel 18 and the back panel 20 are preferably hingedly connected to the base portion 19 of the enclosure by pin connections 25 between the panels 18, 20 and upright corner-posts of the base portion, which form axles about which the end panels can pivot relative to the base portion. The first and second side panels 14, 16 are preferably hingedly connected to the base portion of the enclosure by connector links 27 between the upright corner-posts of the base portion and end-posts of the side panels, to permit pivotal folding of the side panels relative to the base portion. The top panel 12 is preferably hingedly connected to the first side panel 14 (or alternatively to the second side panel 16, or to one of the end panels 18, 20) along adjacent edges thereof by connector links 27 between end-posts thereof.

The positions of the hinge or pivot joints connecting one or more of the panels 14, 16, 18, 20 to the base 19 are preferably offset from one another at different elevations above the floor or other underlying support surface (in the assembled configuration of the enclosure, with the feet 23 resting on a flat support surface), so that when the enclosure 10 is fully collapsed or folded (as shown in FIG. 4), the complete enclosure is substantially flat and compact with all of the panels able to closely overlie one another. Alternatively, short connector links are interposed between one or more of the panels 14, 16, 18, 20 and the base 19 to permit the panels to fold flat against the base. Although the panels of the depicted embodiments are hingedly connected to the base or to one or more adjacent panel(s) by one or more hinges, pin connections, connector links or the like for ease of assembly and disassembly, in alternate embodiments the panels are separably detachable from one another for disassembly and storage, and/or are releasably or permanently connected to one another by one or more screws, bolts, pins, snap couplings, ties, weldments, adhesive joints, or other detachable or permanent connector(s) to assemble the enclosure 10 for use. In still other alternative embodiments, the panels are rigidly and permanently affixed to one another.

Figure 5A:
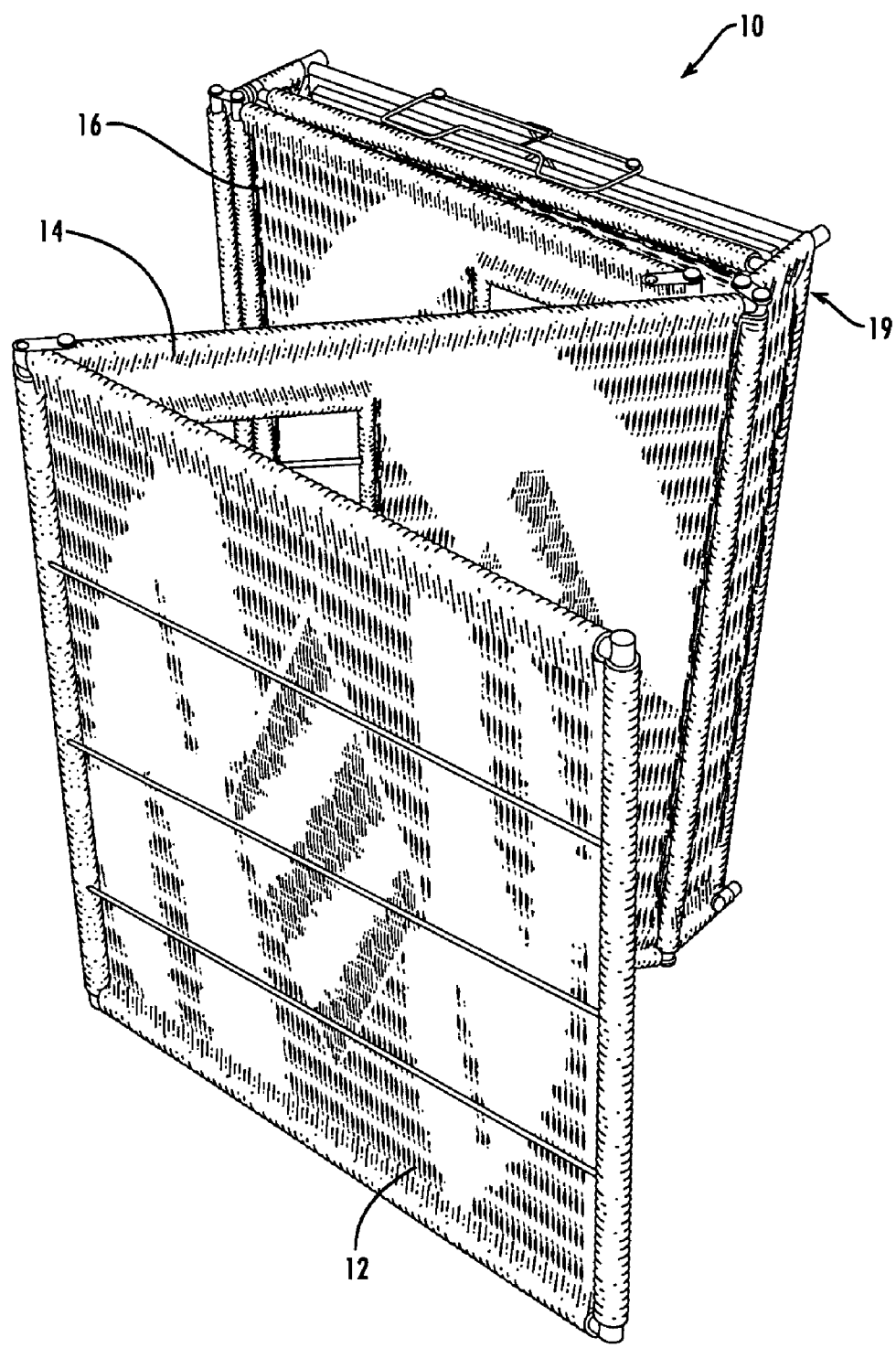
FIGS. 5a–5h show representative steps in the set-up and assembly of the pet enclosure of FIG. 4.
Figure 5B:
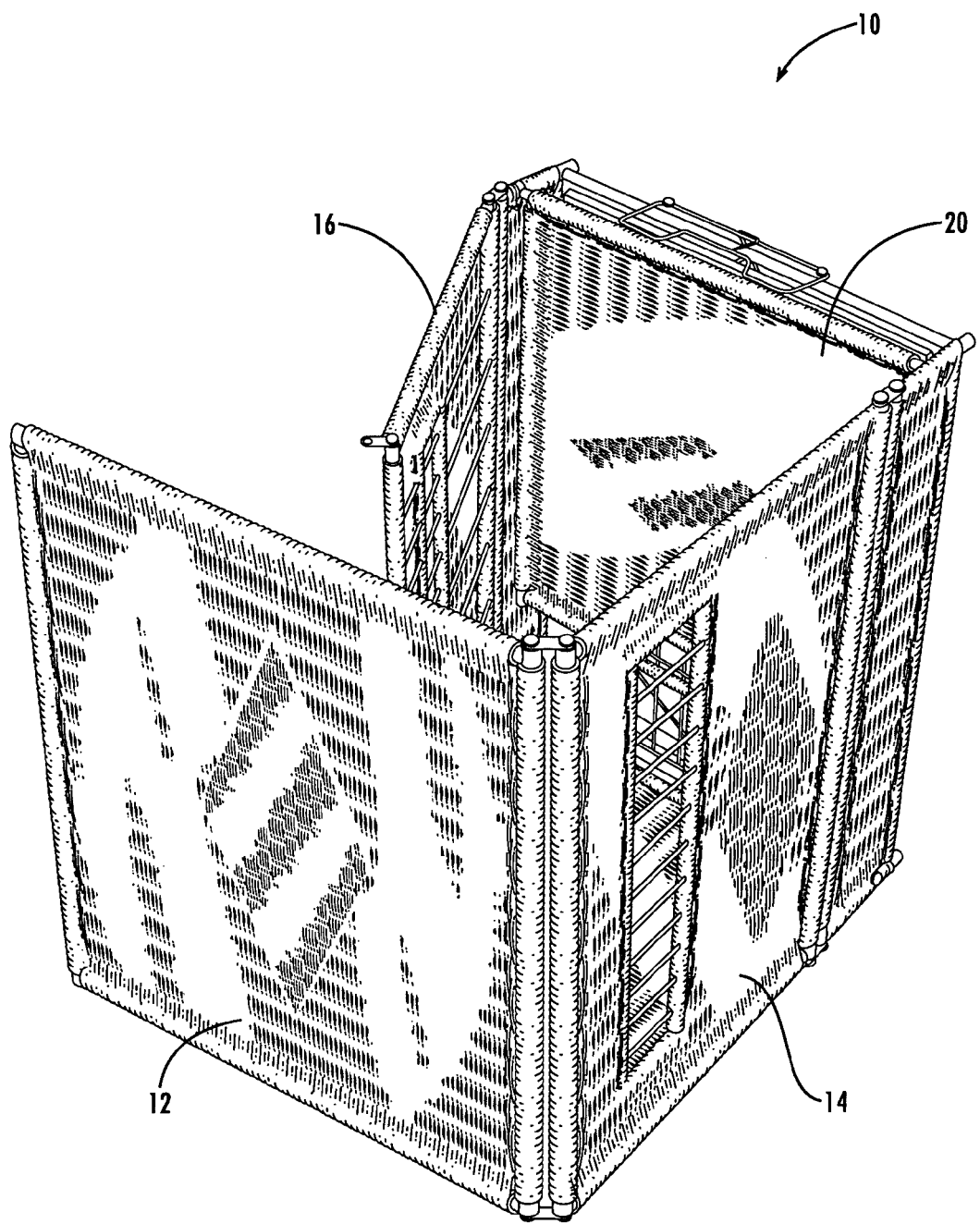
Figure 5C:
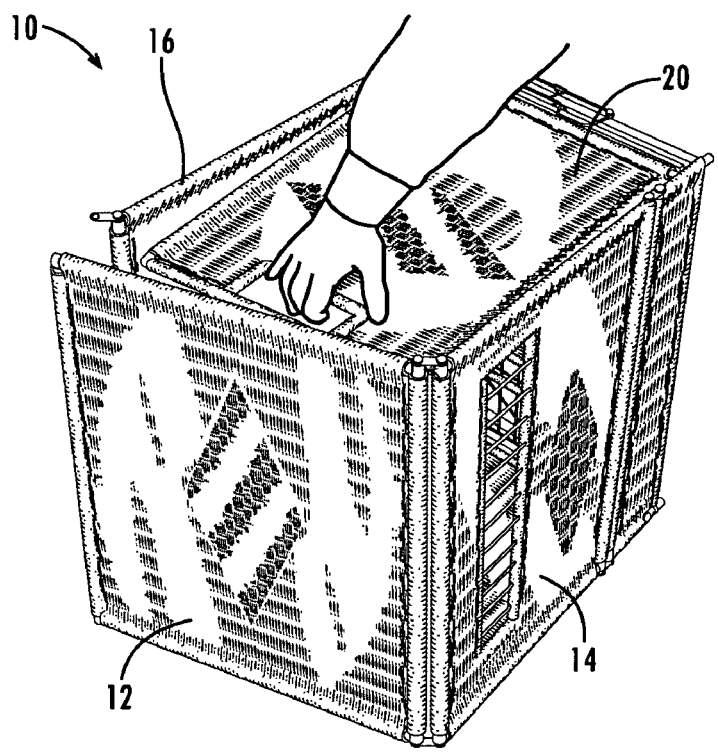
Figure 5D:
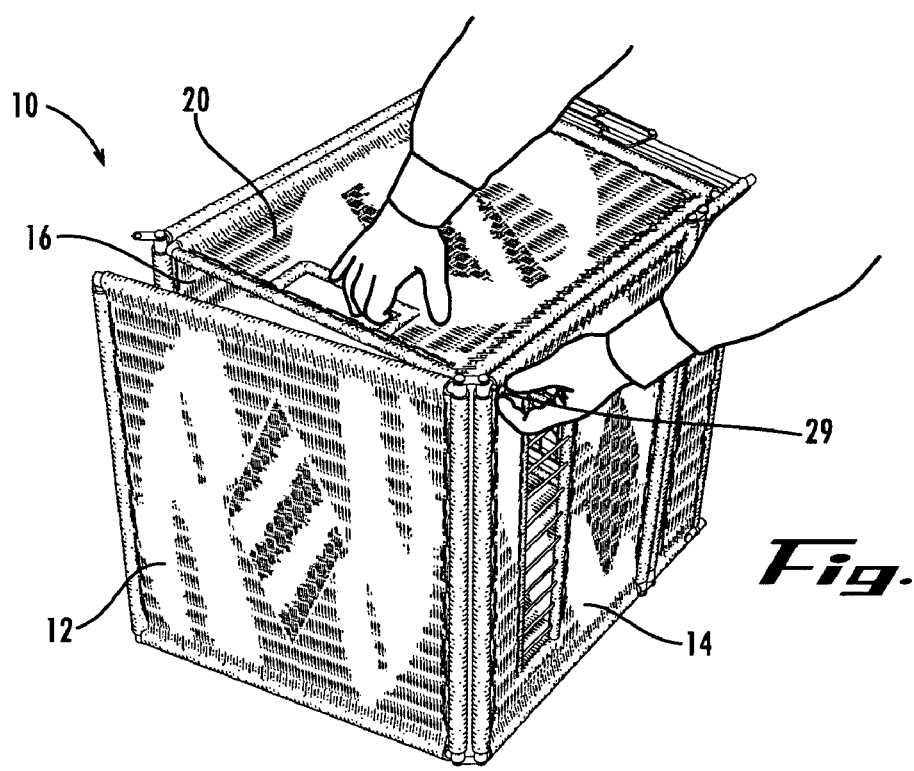
Figure 5E:
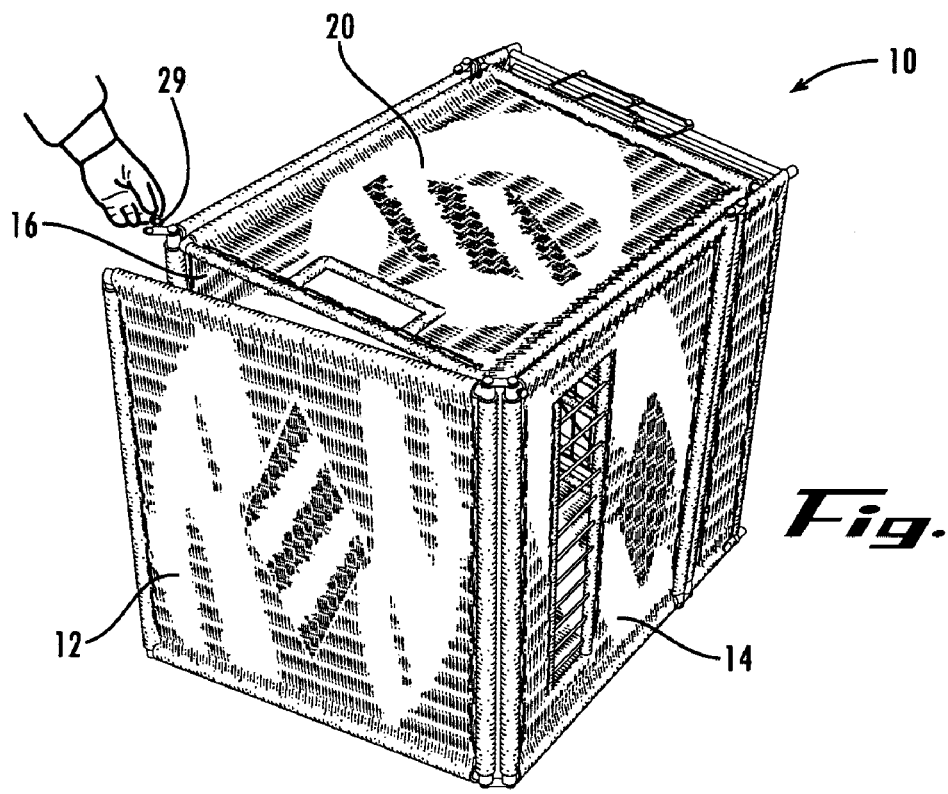
Figure 5F:
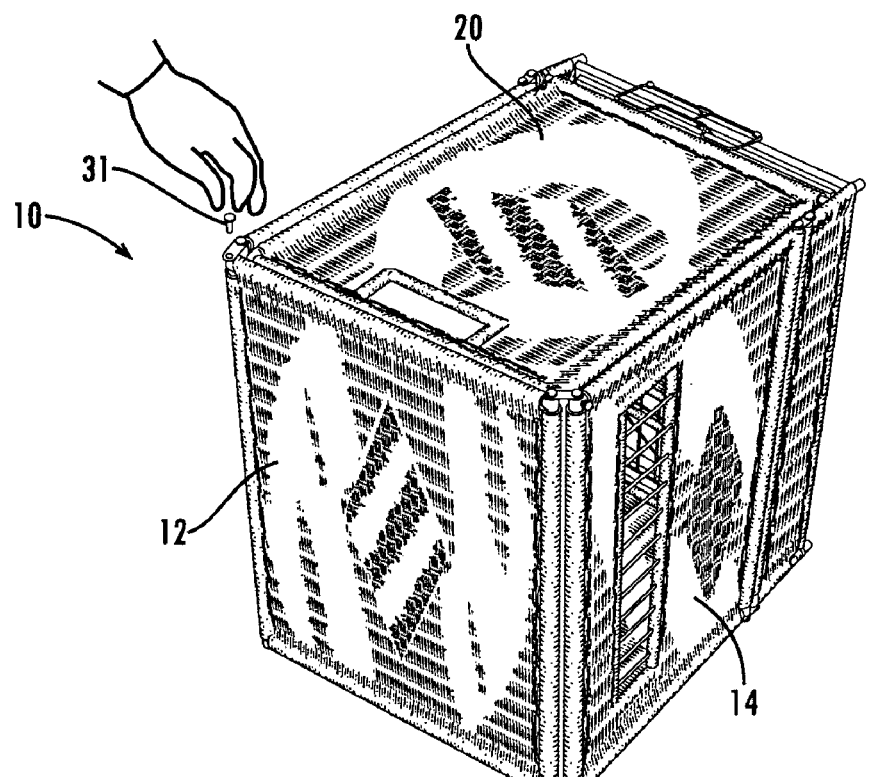
Figure 5G:
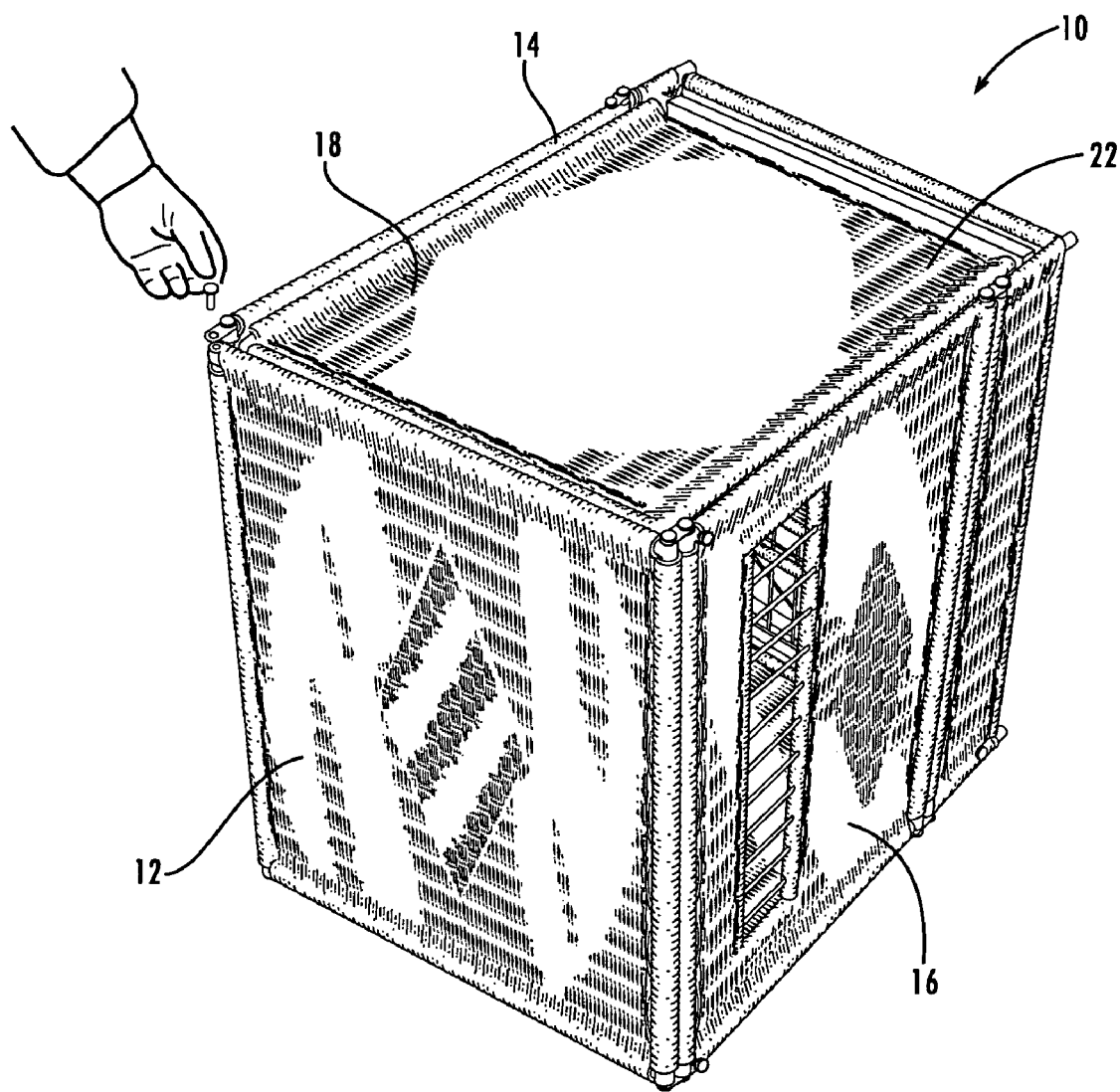
Figure 5H:
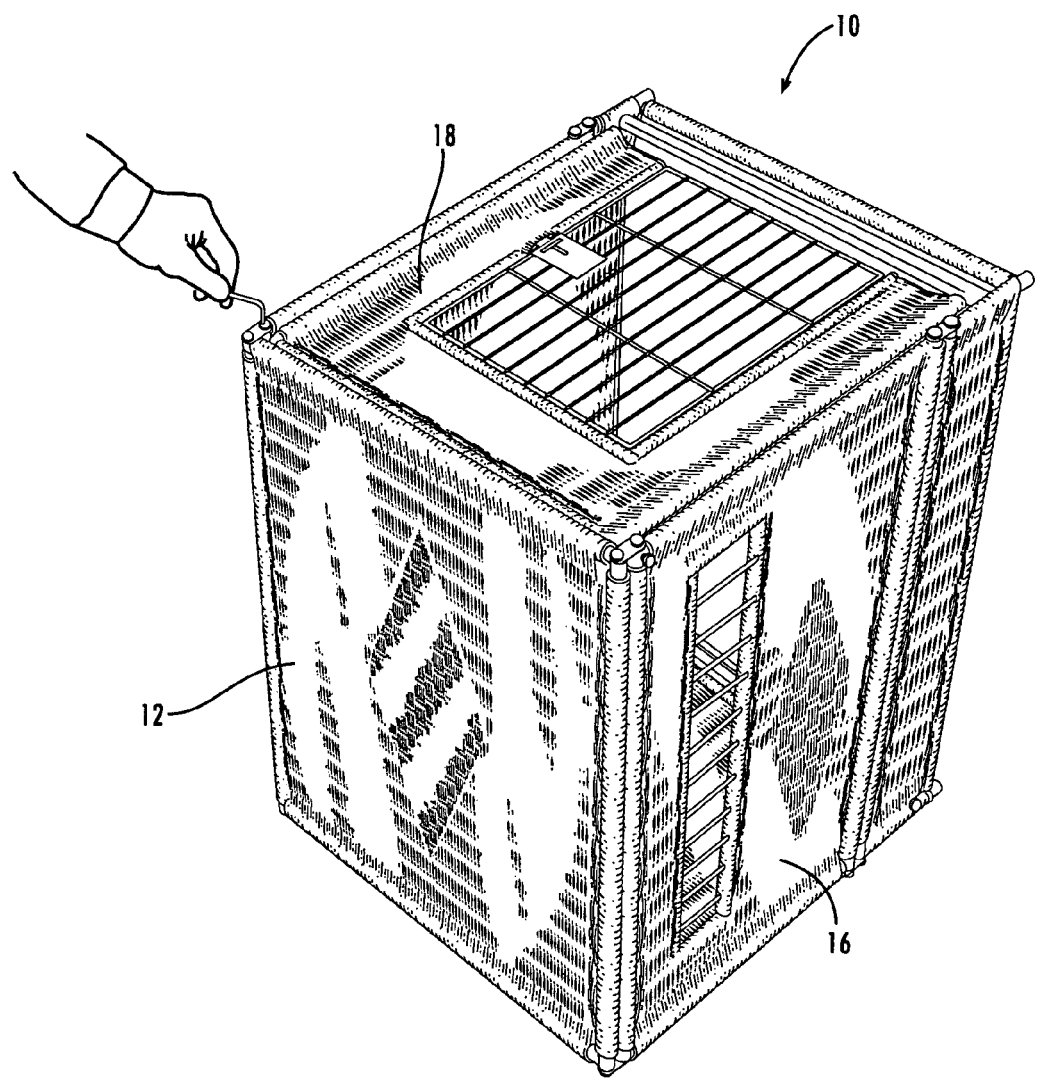
Figure 6:
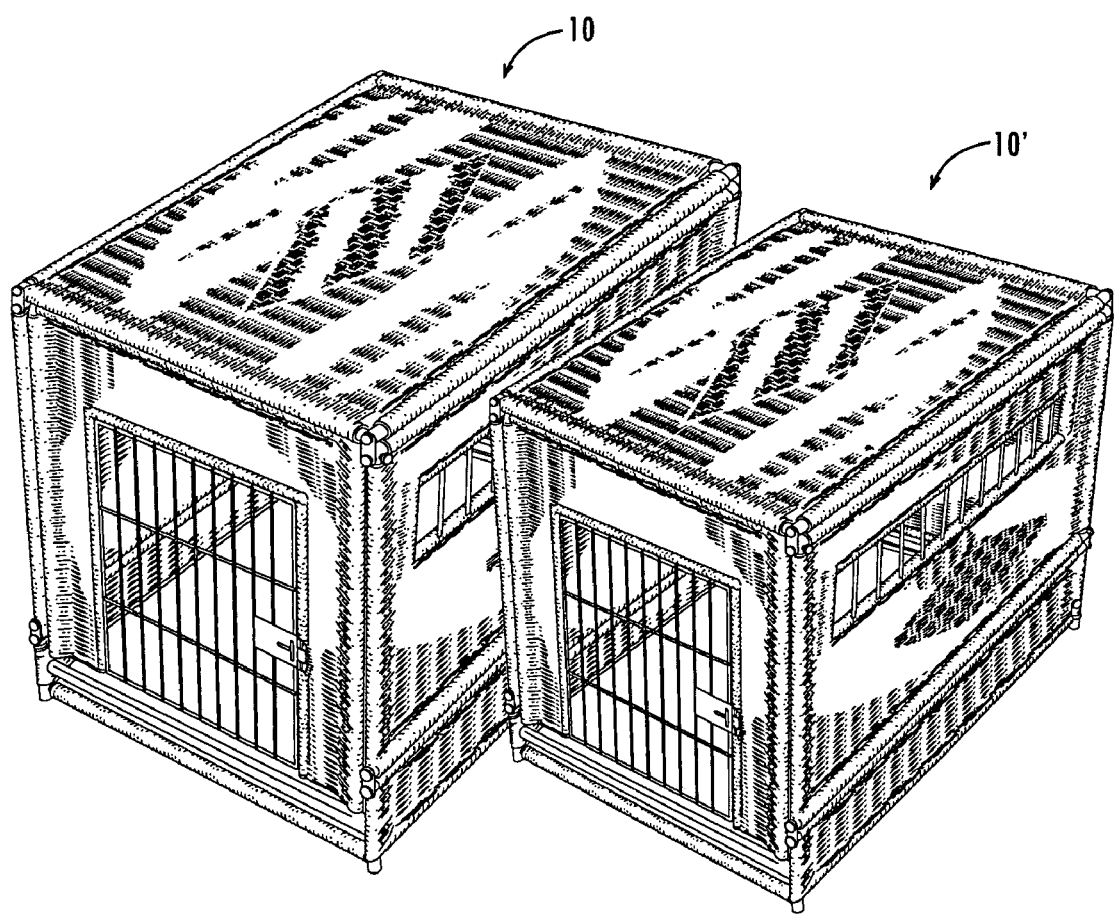
FIG. 6 shows differently-sized embodiments of pet enclosures according to the present invention.
Figure 1C:
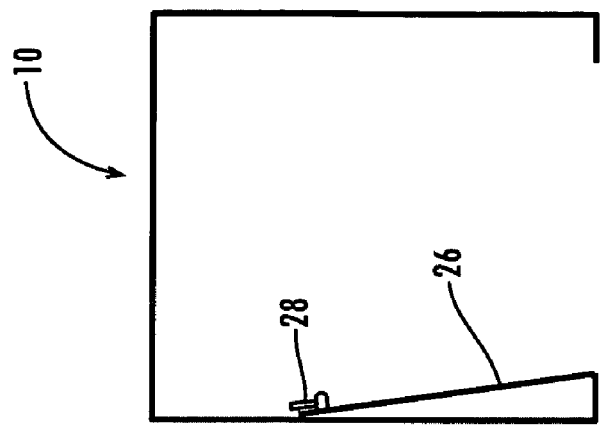
Figure 1B:
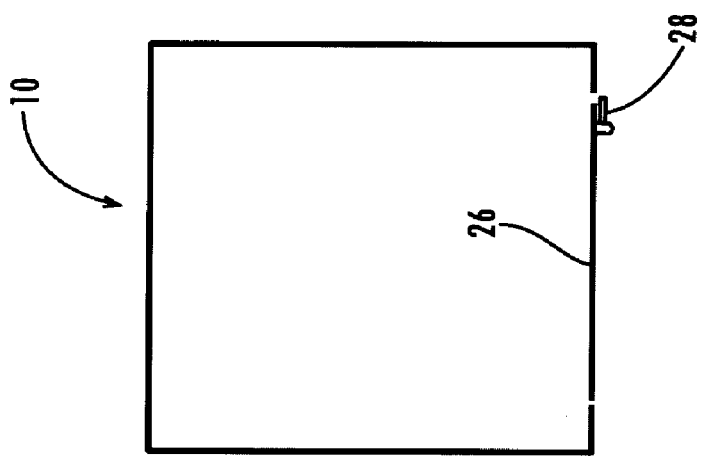
Figure 1A:
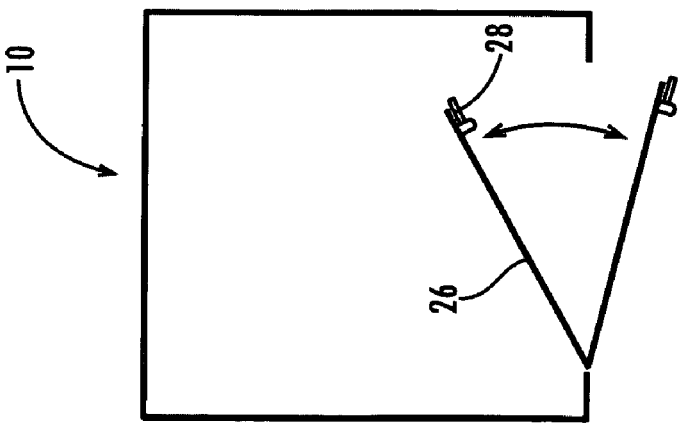

FIGS. 4a–4b show an embodiment of the enclosure 10 in a fully collapsed or folded configuration, as for storage or transport. FIGS. 5a–5h show representative steps in an example assembly sequence for setting up or assembling the enclosure 10 from its folded configuration shown in FIG. 4 into its assembled configuration shown in FIG. 6. As shown in FIGS. 5a and 5b, the top panel 12 is preferably first pivoted about and away from the side panel 14, and the side panel 14 is pivoted about and away from the base portion 19 of the enclosure. The second side panel 16 is then pivoted about and away from the base portion of the enclosure, for form an open-ended, generally box-like configuration. As shown in FIGS. 5c–5e, the back panel 20 is then pivoted about and away from the base portion of the enclosure, into position between the side panels 14, 16. Corner-posts of the back panel 20 and the side panels 14, 16 are aligned and pins, screws, bolts, clips or other connectors 29 are then installed at the upper ends of the corner-posts of the back panel 20 and the side panels 14, 16, as shown in FIGS. 5d and 5e, to secure the back panel and side panels in their upright or assembled positions. The top panel 12 is then closed onto the top of the second side panel 16 and a connector link 31 is secured therebetween, as shown in FIG. 5f, to affix the top panel in its assembled position. The assembly is turned over, end-for-end, and the front panel 18 is then pivoted about and away from the base portion of the enclosure as shown in FIG. 5g. Corner-posts of the front panel 18 and the side panels 14, 16 are aligned and connectors 29 are then installed at the upper ends of the corner-posts of the front panel 18 and the side panels 14, 16 to secure the front panel and side panels in their upright or assembled positions. Another connector link 31 is then secured between the top panel 12 and the second side panel 16. The connectors are then tightened by hand or using a tool such as an Allen wrench, as shown in FIG. 5h, to complete the assembly. The enclosure 10 is then turned over to rest on its feet 23 in the assembled configuration shown in FIG. 6. As shown in FIG. 6, enclosures 10, 10' of different sizes can be provided for different sizes of pets. The enclosure is folded for storage and/or transport by substantially reversing the above operation.

With reference now to FIGS. 2 and 7a–7c, the front panel 18 preferably defines an opening 24 within which a door 26 is hingedly mounted. The door 26 preferably pivots both inwardly into the enclosure and outwardly of the enclosure, as indicated by the directional arc in FIG. 7a. A latch 32, such as a spring-biased element, one or more magnetic coupling(s), and/or other releasable connector(s) is preferably mounted to the door 26 for securing the door in its closed position, as shown in FIGS. 1 and 7b to prevent exit or entrance into the enclosure 10. The latch 32 preferably also allows the door 26 to be secured in an inwardly open position, as shown in FIG. 7c, and/or in an outwardly open position, so that the pet may freely enter and exit the enclosure 10, whereby the enclosure serves more as a "den" or refuge for the pet than a cage or enclosure. Latching the door 26 in an inwardly open position also prevents inadvertent opening of the door and keeps the door out of the way of human foot traffic passing by the enclosure 10, where it otherwise might create a tripping hazard or an obstacle. The latch 32 is preferably operable with one hand to open and close the door 26, so that the user has another hand free, for example to grab the pet's collar to attach a leash. In alternate embodiments, the latch is mounted internally of the enclosure for improved aesthetics.

Figure 8A:
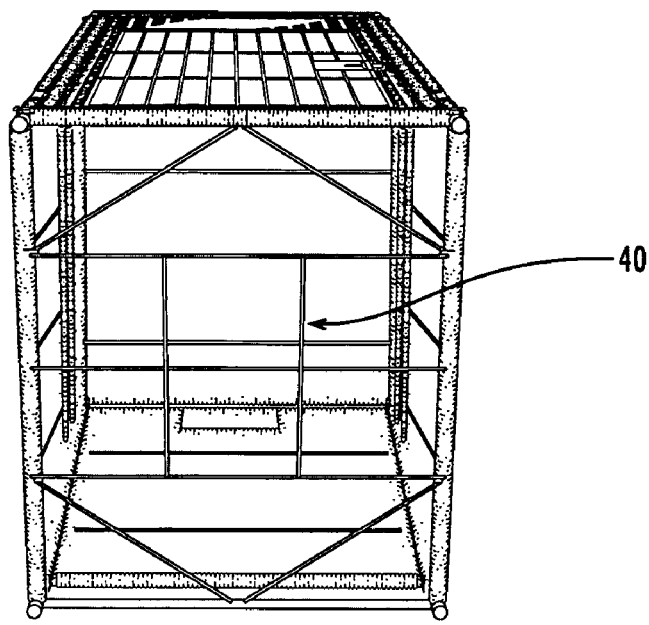
FIGS. 8a and 8b show a raised floor arrangement of a pet enclosure according an embodiment of the present invention.
Figure 8B:
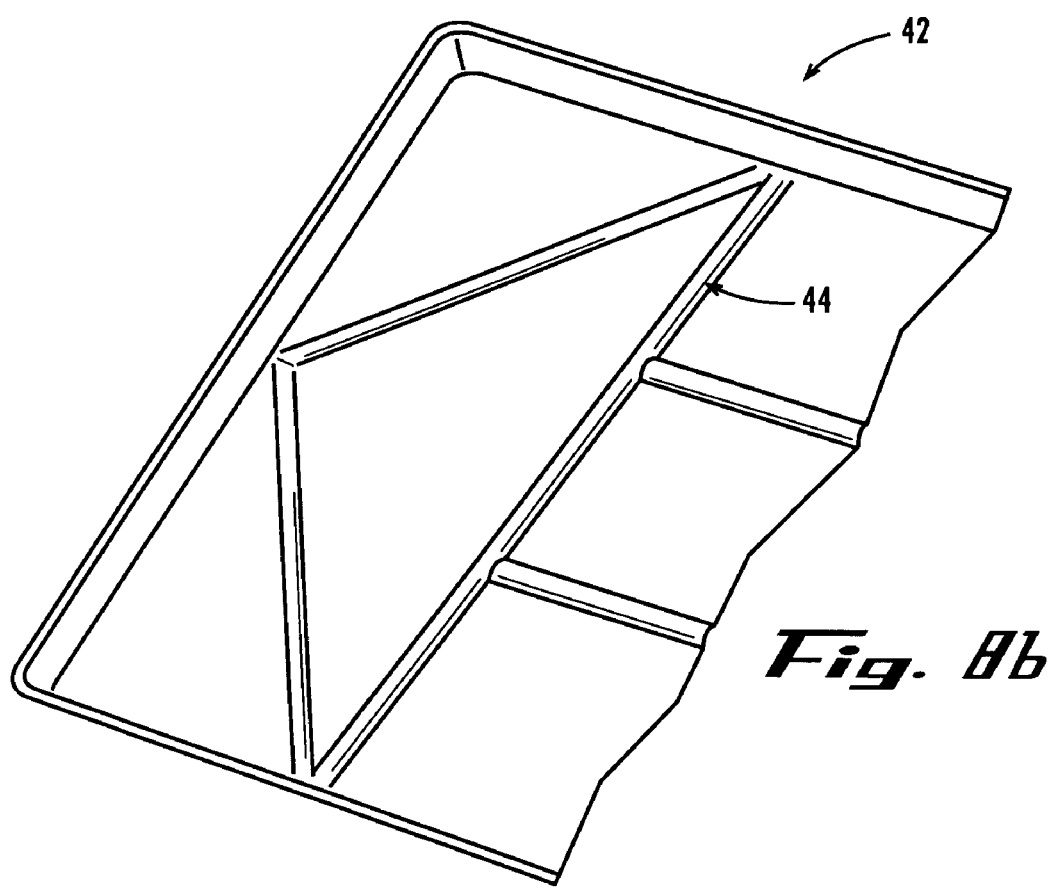

FIGS. 8a and 8b show floor framing 40 of an example embodiment of the enclosure of the present invention, to which a removable floor pan 42 is preferably mounted. One or more channels or grooves 44 in the floor pan 42 preferably receive cooperating portions of the floor framing 40 with a closely engaging fit, to releasably secure the floor pan to the floor framing. In further preferred form, a plurality of channels or grooves 44 are configured to receive a plurality of cooperating frame portions therein, and one or more of the channels or grooves are angularly offset from one or more other channels or grooves so that the floor pan 42 resists movement in all directions. This provides a more stable platform for the pet and reduces noise that would otherwise result from relative movement between the floor pan and the framing. The floor pan 42 may be removed, as for cleaning, by removing the connectors 29 securing the front panel 18 to the side panels 14, 16 (FIG. 2), and pivoting the front panel down and away from the remainder of the enclosure. The pan 42 is then lifted away from the framing 40 and pulled out of the enclosure through the opening formed by lowering the front panel 18. A further advantage of example embodiments of the enclosure of the present invention is that the floor surface upon which the pet rests is elevated a distance above the underlying floor or other support surface. The feet 23 and the floor framing 40 hold the floor pan 42 or other floor surface of the enclosure above the underlying support surface, to provide ventilation between the floor the pet rests on and the surface supporting the enclosure. This increases comfort for the pet, allows dissipation of moisture and thereby reduces odor, and prevents damage to the floor beneath the enclosure.

While the invention has been described with reference to preferred and example embodiments, it will be understood by those skilled in the art that a variety of modifications, additions and deletions are within the scope of the invention, as defined by the following claims.

What is claimed is:

1. A pet enclosure comprising:
   a frame formed of a substantially rigid, non-porous material;
   a flexible, non-porous material woven onto said frame, wherein the frame comprises a plurality of panels and wherein one of the panels defines an opening in which a door is pivotally mounted; and
   a floor panel supported a distance above an underlying support surface, wherein the floor panel comprises at least one channel for receiving a cooperating portion of said frame.

2. The enclosure of claim 1, wherein the plurality of panels are generally flat, rectangular panels.

3. The enclosure of claim 2, wherein the panels are pivotally connected to one another to allow folding of the enclosure into a compact configuration and assembly of the enclosure into an assembled configuration without separation of the panels from one another.

4. The enclosure of claim 3, wherein the enclosure is substantially flat in the compact configuration.

5. The enclosure of claim 2, wherein the door is pivotally mounted to swing both inwardly and outwardly.

6. The enclosure of claim 5, further comprising a latch for securing said door in a closed position and in an open position.

7. The enclosure of claim 6, wherein the latch secures said door in an inwardly open position within the enclosure.

8. The enclosure of claim 1, wherein the substantially rigid, non-porous material of the frame is a metal wire.

9. The enclosure of claim 1, wherein the flexible, non-porous material woven onto said frame is a plastic having the appearance of natural rattan or wicker.

10. The enclosure of claim 1, wherein the floor panel comprises a plurality of channels or grooves configured to receive a plurality of cooperating frame portions therein, and wherein one or more of the plurality of channels or grooves is/are angularly offset from one or more other channels or grooves, so that the floor panel resists movement in all directions.

11. A pet enclosure comprising:
    a plurality of panels, each panel comprising a substantially rigid frame and a plastic material woven onto said frame and having the appearance of natural rattan or wicker and wherein at least one panel defines an opening therein in which a door is pivotally mounted; and
    a floor panel supported a distance above an underlying support surface, wherein the floor panel comprises at feast one channel for receiving a cooperating portion of said frame.

12. The enclosure of claim 11, wherein the plurality of panels are pivotally connected to one another to allow folding of the enclosure into a compact configuration and assembly of the enclosure into an assembled configuration without separation of the panels from one another.

13. The enclosure of claim 11, wherein one of the plurality of panels defines an opening in which a door is pivotally mounted to swing both inwardly and outwardly.

14. The enclosure of claim 13, further comprising a latch for securing said door in a closed position and in an open position.

15. The enclosure of claim 14, wherein the latch secures said door in an inwardly open position within the enclosure.

16. A pet enclosure comprising:
    a base portion;
    a first side panel hingedly connected to the base portion;
    a second side panel hingedly connected to the base portion;
    a first end panel hingedly connected to the base portion;
    a second end panel hingedly connected to the base portion; and
    a top panel hingedly connected to at least one panel selected from said side and said end panels, and wherein at least one of said panels comprise a substantially rigid frame and a plastic material woven on said frame and having the appearance of natural rattan or wicker, and wherein a hinge connection between a first of said panels and the base portion is offset from a hinge connection between a second of said panels and the base portion to permit the panels to fold into a compact configuration.

17. A pet enclosure comprising:
    a base portion;
    a first side panel hingedly connected to the base portion;
    a second side panel hingedly connected to the base portion;
    a first end panel hingedly connected to the base portion;
    a second end panel hingedly connected to the base portion; and
    a top panel hingedly connected to at least one panel selected from said side and said end panels, and wherein at least one of said panels comprise a substantially rigid frame and a plastic material woven on said frame and having the appearance of natural rattan or wicker, wherein short connector links are interposed between one or more of said panels and the base portion to permit the panels to fold into a compact configuration.

* * * * *